(12) United States Patent
Ohike

(10) Patent No.: US 11,317,644 B2
(45) Date of Patent: May 3, 2022

(54) LIQUID SEASONING COMPRISING INGREDIENTS

(71) Applicants: MIZKAN HOLDINGS CO., LTD., Aichi (JP); MIZKAN CO., LTD., Aichi (JP)

(72) Inventor: Masaki Ohike, Aichi (JP)

(73) Assignees: MIZKAN HOLDINGS CO., LTD., Aichi (JP); MIZKAN CO., LTD., Aichi (JP)

( * ) Notice: Subject to any disclaimer, the term of this patent is extended or adjusted under 35 U.S.C. 154(b) by 189 days.

(21) Appl. No.: 16/035,165

(22) Filed: Jul. 13, 2018

(65) Prior Publication Data
US 2019/0014804 A1  Jan. 17, 2019

(30) Foreign Application Priority Data
Jul. 14, 2017 (JP) .............................. JP2017-137570

(51) Int. Cl.
| A23L 27/16 | (2016.01) |
| A23L 27/20 | (2016.01) |
| A23L 27/22 | (2016.01) |
| A23L 19/00 | (2016.01) |

(52) U.S. Cl.
CPC .............. *A23L 27/16* (2016.08); *A23L 19/00* (2016.08); *A23L 27/2028* (2016.08); *A23L 27/2056* (2016.08); *A23L 27/22* (2016.08); *A23V 2002/00* (2013.01); *A23V 2200/15* (2013.01); *A23V 2250/022* (2013.01); *A23V 2250/0618* (2013.01); *A23V 2300/24* (2013.01)

(58) Field of Classification Search
CPC ...... A23L 27/00; A23L 27/16; A23L 27/2028; A23L 27/2056; A23L 27/215; A23L 27/22; A23L 19/00; A23L 23/00
USPC ........................................................ 426/650
See application file for complete search history.

(56) References Cited

U.S. PATENT DOCUMENTS 6,468,565 B1 * 10/2002 Anno .................... A23L 27/105
                                                           426/49

FOREIGN PATENT DOCUMENTS

| JP | S61-67458 A | 4/1986 |
| JP | H11130 A | 1/1999 |
| JP | H11178550 A | 7/1999 |
| JP | 2004-229623 A | 8/2004 |
| JP | 2006-254817 A | 9/2006 |
| JP | 2007209296 A | 8/2007 |
| JP | 2009-189324 A | 8/2009 |
| JP | 2011-41508 A | 3/2011 |
| JP | 2011-125298 A | 6/2011 |
| JP | 2011182756 A * | 9/2011 |
| JP | 2013-132279 A | 7/2013 |
| JP | 2017-61431 A | 3/2017 |
| JP | 2017-93430 A | 6/2017 |
| JP | 2017099317 A | 6/2017 |
| WO | 99/08548 A1 | 2/1999 |

OTHER PUBLICATIONS

Identification and Quantitation of New Glutamic Acid Derivatives in Soy Sauce by UPLC/MS/MS Eric Frerot First published: Oct. 16, 2013, Chem Biodiversity: Oct. 2013;10(10):1842-50. doi: 10.1002/cbdv.201300150. (Year: 2013).*
Kristi Crowe, "Umami in Foods: What is Umami and how do I Explain It?" obtained from Academy of Nutrition and Dietetics Evidence Analysis Library, www.andeal.org, 2013, 3 pages (Year: 2013).*
Guide of Mizkan new products for business use in Spring 2017, (http://www.mizkan.co.jp/company/newsrelease/2017news/170118-00.html), with partial translation (2 pages).
Ueda, Y. et al., "Composition of Sulfur-Containing Components in Onion and Their Flavor Characters" Bioscience Biotechnology & Biochemistry, vol. 58, No. 1, pp. 108-110, 1994 (3 pages).
Kim S. et al., "Change in Organosulfur Compounds in Onion (*Allium cepa* L.) during Heat Treatment" Food Science and Biotechnology, vol. 25, No. 1, pp. 115-119, 2016 (5 pages).
Office Action issued in corresponding Japanese Application No. 2017-137570 dated Jun. 3, 2021 (8 pages).
Third-party submission for corresponding Japanese Application No. 2017-137570 dated Jun. 15, 2012 (11 pages).
Third party submitted his opinion and/or information dated Feb. 2, 2021 (14 pages).
Third party submitted his opinion and/or information dated Mar. 16, 2021 (10 pages).

* cited by examiner

*Primary Examiner* — Jyoti Chawla
(74) *Attorney, Agent, or Firm* — Osha Bergman Watanabe & Burton LLP

(57) ABSTRACT

A liquid seasoning includes a seasoning liquid and ingredients, wherein the seasoning liquid and the ingredients are prepared by subjecting a raw material including at least an onion ingredient and an organic acid to a heat treatment, wherein an amount of cycloalliin in the liquid seasoning with respect to an amount of the onion ingredient swollen in the seasoning liquid is 0.30% by mass or more, and wherein pH of the seasoning liquid is 2.5 to 4.5.

7 Claims, No Drawings

LIQUID SEASONING COMPRISING INGREDIENTS

TECHNICAL FIELD

One or more embodiments of the present invention relate to a liquid seasoning comprising ingredients with enhanced stewed feeling, taste, and food texture, which are specific to onions.

BACKGROUND

Conventionally, seasonings having various tastes or forms have been used in salads or prepared foods. Among others, in the case of a liquid seasoning containing ingredients such as granted vegetables or finely chopped vegetables in its seasoning liquid, since ingredients have previously been added into a seasoning liquid, time and effort for preparing ingredients separately, then mixing them with a seasoning liquid, and then cooking the obtained mixture, for example, by heating it, can be saved. In addition, such a liquid seasoning comprising ingredients comprises a variety of ingredients, and thus, it can respond to diversified consumer needs.

Such a liquid seasoning comprising ingredients has been designed to enhance flavor and taste. For example, in Patent Document 1, there is proposed a method for producing a seasoning, comprising mixing ingredients such as granted vegetables or fruits into a base liquid containing soy sauce and sugars, in which the amount of 3-methyl-butanal has been increased by heating it. However, this method is neither intended to impart stewed feeling to ingredients, nor to enhance the taste of ingredients in the seasoning liquid. Moreover, in Patent Document 2, there is proposed a liquid seasoning, in which the flavor and taste of Alliaceae vegetables has been enhanced by mixing the heat-treated Alliaceae vegetables with oil and fat (diacylglycerol). In the case of this liquid seasoning, however, Alliaceae vegetables used as ingredients alone have been subjected to a heat treatment, and thus, only the flavor and taste of the ingredients have been enhanced, separately from the seasoning liquid. Furthermore, in Patent Document 3, in order to reduce the off-flavor of dried vegetables in a liquid seasoning comprising, as ingredients, dried vegetables such as dried onions, there is proposed a method for producing an acidic liquid seasoning, comprising a step of previously subjecting dried vegetables to a heat treatment in an organic acid aqueous solution. However, this method cannot sufficiently impart the taste of the ingredients to the seasoning liquid, and further, the stewed feeling of the ingredients cannot be obtained, either.

Patent Document 1: JP Patent Publication (Kokai) No. 2004-229623 A
Patent Document 2: JP Patent Publication (Kokai) No. 2009-189324 A
Patent Document 3: JP Patent Publication (Kokai) No. 2011-125298 A

SUMMARY

One or more embodiments of the present invention provide a liquid seasoning comprising ingredients, in which the stewed feeling of onions used as ingredients and the taste of onions in a seasoning liquid are improved, and onion-derived flavor and rich taste are imparted to the entire seasoning.

The present inventor has found that the content of cycloalliin that is a taste component of onions is increased both in ingredients and in a seasoning liquid by subjecting a raw material comprising ingredients mainly containing onions and an organic acid to a heat treatment under specific conditions, that the stewed feeling of onions and the taste of onions in a seasoning liquid are improved, and that, as a result, onion-derived flavor and rich taste are imparted to the entire seasoning.

One or more embodiments of the present invention include the following inventions.

(1) A liquid seasoning, comprising a seasoning liquid and ingredients,
wherein the seasoning liquid and the ingredients are prepared by subjecting a raw material comprising at least an onion ingredient and an organic acid to a heat treatment,
wherein an amount of cycloalliin in the liquid seasoning with respect to an amount of the onion ingredient swollen in the seasoning liquid is 0.30% by mass or more, and
wherein pH of the seasoning liquid is 2.5 to 4.5.
(2) The liquid seasoning according to the above (1), wherein a content of cycloalliin in the liquid seasoning comprising ingredients is 0.12% by mass or more.
(3) The liquid seasoning according to the above (1) or (2), wherein the onion ingredient is a heat-treated onion.
(4) The liquid seasoning according to the above (3), wherein the heat-treated onion is at least one selected from the group consisting of dried onion, boiled onion, steamed onion, sauteed onion, and caramelized onion.
(5) The liquid seasoning according to any one of the above (1) to (4), wherein the organic acid is at least one selected from the group consisting of acetic acid, malic acid, citric acid, lactic acid, and succinic acid.
(6) The liquid seasoning according to any one of the above (1) to (5), wherein the raw material comprises at least one organic acid-containing product selected from the group consisting of vinegar, fruit juice, and organic acid-based seasonings, and wherein the organic acid is an organic acid contained in the at least one organic acid-containing product.
(7) The liquid seasoning according to any one of the above (1) to (6), wherein the heat treatment is performed at a temperature of 75° C. to 120° C.
(8) The liquid seasoning according to any one of the above (1) to (7), wherein a content of glutamic acid in the liquid seasoning is 70 to 3000 ppm by mass.
(9) The liquid seasoning according to any one of the above (1) to (8), which is used in heating cooking or for hot dishes.
(10) A method for producing the liquid seasoning according to any one of the above (1) to (9), comprising a step of subjecting a raw material comprising at least an onion ingredient and an organic acid to a heat treatment at a temperature of 75° C. to 120° C., and a step of leaving or cooling the resultant to an ordinary temperature.
(11) A heating cooking method, in which the liquid seasoning according to any one of the above (1) to (9) is used.

This description includes part or all of the content as disclosed in the description and/or drawings of Japanese Patent Application No. 2017-137570 filed on Jul. 14, 2017, which is a priority document of the present application.

According to one or more embodiments of the present invention, a liquid seasoning comprising ingredients, which has ingredient feeling full of onions and sufficient flavor and taste of fully stewed onions, is provided. In one or more embodiments, the liquid seasoning comprising ingredients does not need to prepare onions by chopping them separately, and can be directly used as is, or can be simply and generically used as a highly cooked sauce or tare (thick sauce) for various dishes only by being mixed with other food materials.

DETAILED DESCRIPTION OF EMBODIMENTS

The liquid seasoning comprising a seasoning liquid and ingredients according to one or more embodiments of the present invention (hereinafter also referred to as "the liquid seasoning") a liquid seasoning comprising a seasoning liquid and ingredients prepared by subjecting a raw material comprising at least an onion ingredient and an organic acid to a heat treatment, which is characterized in that the content of cycloalliin to the onion ingredient swollen in a seasoning liquid and pH are within predetermined ranges.

Ingredients

The term "ingredient(s)" used in the present description means a solid food material(s) having visible size and specific food texture, which is contained in a liquid seasoning, together with a seasoning liquid.

Onion Ingredient

Onion ingredient used as a main ingredient in the liquid seasoning is not limited in terms of variety and the area of production.

The term "onion ingredient" is used in the present description to mean onion sections (cut onions) prepared by cutting commonly edible bulb scales to a predetermined size. The onions used in one or more embodiments of the present invention are preferably heat-treated onions. Specifically, the present onions may be any of dried onions, boiled onions, sauteed onions, steamed onions, and caramelized onions, and one or two or more of them can be used. Among these heat-treated onions, dried onions are preferable because the seasoning liquid is easily permeable therein and high stewed feeling can be obtained. In addition, such dried onions are advantageous in that they do not always need refrigeration or freezing.

The dried onions can be produced by cutting onions to a predetermined size and then drying them, or by drying onions and then cutting them. Examples of the drying method include hot air drying, vacuum heat drying, microwave drying, sun drying, natural drying, and freeze drying. The water content of the dried onions is preferably 10% by mass or less, more preferably 8% by mass or less, and further preferably 5% by mass or less, from the viewpoint of preventing excess water from transferring to the seasoning liquid.

The dried onions may also be prepared by mixing onions with sugars before drying, or by immersing onions in a sugar-containing solution, followed by heat-mixing. Specifically, examples of such sugars include glucose, fructose, sucrose, lactose, and starch hydrolysate. Two or more of these sugars may also be used. The amount of sugars added, mixing time, and the concentration of sugars in the case of immersing onions in a sugar-containing solution, the temperature and time for the heat-mixing operation, and the temperature and time for the subsequent drying operation may be arbitrarily selected depending on the size of onions, etc. The amount of sugars added upon the mixing of onions with the sugars is preferably 5% to 30% by mass, based on the mass of dried onions. The concentration of sugars upon immersion of onions in a sugar-containing solution is preferably 5% to 30% by mass. The conditions for the heat-mixing in the solution are preferably a temperature of 50° C. to 80° C. and a period of time of 10 minutes to 12 hours.

Moreover, the dried onions may also be produced by heat-mixing cut onions in a calcium salt solution and then drying them. The concentration of the calcium salt solution, the temperature and time for the heat-mixing operation, and the temperature and time for the subsequent drying operation may be arbitrarily selected depending on the size of onions, etc. Specifically, the dried onions may be produced by stirring cut onions in an aqueous solution prepared by dissolving calcium salts such as calcium chloride, calcium lactate or calcium acetate in water to a concentration of 0.5% to 5% by mass, at 50° C. to 80° C. for 1 to 120 minutes, then separating the resulting onions from the treated solution for the removal of the liquid, and then drying the obtained onions at 65° C. to 80° C. for 3 to 12 hours. The above-described calcium aqueous solution may also comprise sugars such as glucose, fructose, sucrose, lactose or starch hydrolysate in an amount of 5% to 30% by mass.

The above-described boiled onions that can be used herein may be, for example, boil onions prepared by removing outer skin from onions, directly heating them in boiled water without cutting them, then drawing them up, and then cutting them to a specific size, or boil onions prepared by cutting onions to a specific size and then heating the cut onions in boiled water. The above-described steamed onions that can be used herein may be, for example, steamed onions prepared by cutting onions to a specific size and then heating the cut onions with steam under an increased pressure. The above-described sauteed onions that can be used herein may be sauteed onions prepared by cutting onions to a specific size and then heating the cut onions in a pot, etc., as necessary, together with edible oil and fat, mold release oil, etc. The above-described caramelized onions that can be used herein may be sauteed onions, which are further sauteed until they are caramelized.

In one or more embodiments, with regard to the size of an onion section, the length of the longest side of an onion section that has swollen in a seasoning liquid is preferably 1 to 60 mm, more preferably 2 to 50 mm, further preferably 2 to 40 mm, and most preferably 4 to 40 mm. If the size of the swollen onion section is less than 1 mm, food texture cannot be obtained to such an extent that the stewed feeling of onions can be felt. On the other hand, if the size of the swollen onion section exceeds 60 mm, a seasoning liquid hardly permeates into the onion section, stewed feeling cannot be sufficiently obtained, and the workability also becomes poor upon cooking.

In one or more embodiments, the content of an onion ingredient (hereinafter simply referred to as an "ingredient" at times) in the liquid seasoning is 20% to 80% by mass, preferably 30% to 80% by mass, more preferably 40% to 70% by mass, and further preferably 45% to 60% by mass, at a wet weight, based on the mass of the entire seasoning. If the content of the ingredient is less than 20% by mass at a wet weight, both good flavor possessed by onions, and good flavor derived from onions generated as a result of heating the onions in a seasoning liquid, cannot be sufficiently obtained. As such, the flavor of the entire liquid seasoning becomes weak, and thus, it is unsatisfactory. On the other hand, if the content of the ingredient exceeds 80% by mass at a wet weight, the amount of the seasoning liquid becomes too small, resulting in poor workability upon being used for cooking, although the flavor of onions and the flavor of the seasoning liquid are improved.

The liquid seasoning according to one or more embodiments of the present invention may comprise vegetables other than the onion ingredient. The types of other vegetables are not particularly limited. The vegetable that is eaten after being cooked by heating is preferable. Examples of such vegetables include cabbages, Chinese cabbages, carrots, bell peppers, radishes, radish leaves, beets, lotus roots, burdocks, green onions, Japanese basil leaves, celeries, parsleys, paprika, tomatoes, cucumbers, corns (sweet corns), cauliflowers, eggplants, potatoes, sweet potatoes, taros, yams, pumpkins, shiitake mushrooms, maitake mushrooms, oyster mushrooms, king oyster mushrooms, winter mushrooms, shimeji mushrooms, and mushrooms. These vegetables can be used alone or in combination of two or more types. The above-described vegetables other than the onion ingredient can be used. For example, it may be adequate if the onion ingredient accounts for 50% or more of the total amount of the onion ingredient and other vegetables.

Organic Acid

Examples of the organic acid used in the liquid seasoning include acetic acid, malic acid, citric acid, lactic acid, and succinic acid. These organic acids may be used alone as a single type, or may also be used in combination of two or more types. Among the above-described organic acids, acetic acid and malic acid are preferable from the viewpoint of enhancing the stewed feeling and taste of onions. As such organic acid, organic acid itself may be directly used, or may also be used in the form of an organic acid-containing product. Examples of such an organic acid-containing product, preferably, an acetic acid- and/or malic acid-containing product include vinegar, fruit juice, and organic acid-based seasonings.

The above-described vinegar includes: brewed vinegar produced using, as main raw materials, grains such as rice or wheat or fruit juice; and synthetic vinegar prepared by adding a seasoning such as sugar to glacial acetic acid or a diluted solution of acetic acid, or further adding brewed vinegar to the above mixture. Both of the above vinegars can be used herein. Examples of the brewed vinegar include: grain vinegar (rice vinegar, brown rice vinegar, black vinegar, sake lees vinegar, malt vinegar, adlay vinegar, soybean vinegar, etc.); fruit vinegar (apple vinegar, grape vinegar, lemon vinegar, kabosu vinegar, ume vinegar, wine vinegar, balsamico vinegar, etc.); alcoholic vinegar produced by acetic acid fermentation using ethanol as a raw material; and Chinese vinegar. Examples of the synthetic vinegar include glacial acetic acid, and acetic acid which is appropriately diluted with water. Among these, alcoholic vinegar and synthetic vinegar, which comprise a high concentration of acetic acid, are preferable because they comprise a high content of acetic acid and have a weak flavor derived from raw materials. These vinegars may be used alone as a single type, or may also be used in combination of two or more types.

The above-described fruit juice is, for example, fruit juice derived from lemon, yuzu, sudachi, lime, orange, grape fruit, apple, peach, grape, strawberry, pear, banana, melon, kiwi, pineapple, cassis, acerola, blueberry, apricot, guava, plum, mango, papaya, lychee, etc. Among these, fruit juice derived from citruses such as lemon, yuzu, sudachi, lime, orange or grape fruit, or derived from apple, is more preferable. These fruit juices may be used alone as a single type, or may also be used in combination of two or more types.

Examples of the above-described organic acid-based seasonings include sodium acetate, sodium DL-malate, calcium citrate, trisodium citrate, succinic acid, monosodium succinate, disodium succinate, potassium lactate, calcium lactate, and sodium lactate. These organic acid-based seasonings may be used alone as a single type, or may also be used in combination of two or more types.

In one or more embodiments, the content of organic acid in the liquid seasoning (which is converted to the amount of organic acid, when the organic acid is an organic acid-containing product) is preferably 0.1% to 5.0% by mass, more preferably 0.2% to 4.5% by mass, and further preferably 0.5% to 4.0% by mass.

Cycloalliin

It has been known that cycloalliin comprised is generated from a sulfur-containing component as a precursor by heating onions in water, and provides a rich taste in the coexistence thereof with sodium glutamate, sodium inosinate, etc. In one or more embodiments of the liquid seasoning, the content of cycloalliin to the onion ingredient that has been swollen in the seasoning liquid (the amount of cycloalliin in the liquid seasoning with respect to an amount of the onion ingredient swollen in the seasoning liquid) is preferably 0.30% by mass or more, more preferably 0.32% by mass or more, and further preferably 0.38% by mass or more. If the content of cycloalliin to the onion ingredient that has been swollen in the seasoning liquid is less than 0.30% by mass, the stewed feeling and taste of onions are hardly obtained. The upper limit of the content of cycloalliin to the onion ingredient that has been swollen in the seasoning liquid is not particularly limited. However, since the effects are not largely changed even if 2.0% by mass or more of cycloalliin is comprised in the onion ingredient, the upper limit of the content of cycloalliin is preferably 2.0% by mass or less, and more preferably 1.5% by mass or less. On the other hand, in one or more embodiments, the content of cycloalliin in the liquid seasoning is preferably 0.12% by mass or more, more preferably 0.15% by mass or more, and further preferably 0.20% by mass or more. If the content of cycloalliin in the liquid seasoning is less than 0.12% by mass, the stewed feeling and taste of onions become insufficient. The upper limit of the content of cycloalliin in the liquid seasoning is not particularly limited. However, since the effects are not largely changed even if 0.5% by mass or more of cycloalliin is comprised in the liquid seasoning, the upper limit of the content of cycloalliin is preferably 0.5% by mass or less, and more preferably 0.4% by mass or less.

pH

In one or more embodiments, the pH of a seasoning liquid in the liquid seasoning is preferably pH 2.5 to 4.5, and more preferably pH 2.7 to 3.8. If the liquid seasoning is heated in the above-described pH range, it is preferable because cycloalliin increases in the seasoning liquid, and the stewed feeling of onions is easily obtained. If the pH is higher than 4.5, it is unfavorable because cycloalliin hardly increases in the seasoning liquid, and the stewed feeling of onions is not sufficiently obtained. On the other hand, if the pH is lower than 2.5, acid taste becomes too strong, and thus, it is not favorable.

Heat Treatment

A heat treatment (stew heating) is performed on a raw material comprising an onion ingredient and organic acid under conditions in which the amount of cycloalliin is set at the above-described specific amount or more. Specifically, the heating temperature is preferably 75° C. to 120° C., more preferably 85° C. to 120° C., and further preferably 85° C. to 95° C. The heating time depends on the heating temperature, and it can be adjusted as appropriate. The heating conditions are, for example, at 75° C. or higher and lower than 85° C., for 180 minutes to 240 minutes, or at 85° C. or higher and lower than 105° C., for 90 minutes to 240 minutes, preferably at 105° C. or higher and lower than 120° C., for 10 minutes to 90 minutes, more preferably at 85° C. or higher and lower than 105° C., for 90 minutes to 180 minutes, or at 105° C. or higher and lower than 120° C., for 10 minutes to 60 minutes, and further preferably at 85° C. or higher and lower than 95° C., for 90 minutes to 180 minutes. If the heating temperature and the heating time are within the above-described ranges, it is preferable because the stewed feeling can be obtained and the taste increases. If the heating temperature is higher than 120° C., the food texture of onions unfavorably becomes weak. On the other hand, if the heating temperature is lower than 75° C., the content of cycloalliin hardly becomes a specific content even if the onions are heated for a long period of time, and as a result, unfavorably, the stewed feeling can be hardly obtained.

Glutamic Acid

In one or more embodiments, the content of glutamic acid in the liquid seasoning is preferably 70 to 3000 ppm by mass, more preferably 80 to 2500 ppm by mass, and further preferably 120 to 2000 ppm by mass.

Moreover, in one or more embodiments, the liquid seasoning preferably comprises allyl sulfide as a flavor component derived from onions, and thereby, onion-specific flavor and rich taste can be obtained. In addition, it has been said that such allyl sulfide is useful for thromboprophylaxis, suppression of an increase in blood cholesterol, the improvement of immune function, cancer prevention, etc.

Other Raw Materials

In one or more embodiments, the liquid seasoning may comprise raw materials for use in seasoning, etc., which are used in ordinary liquid seasonings depending on the types thereof, as well as the above-described raw materials. In general, water, vinegar, sugars (including a high-intensity sweetener), and common salt are used herein as basic raw materials. For the liquid seasoning according to one or more embodiments of the present invention, in addition to such basic raw materials, for example, taste/flavor components such as a spice, a spice extract, flavor oil, amino acid-based seasonings, nucleic acid-based seasonings, fermented seasonings (flavoring materials, umami seasoning), liquors and a flavor, and additives such as a viscosity adjuster, a stabilizer, a coloring agent or calcium salts, can be used. The content of these components is not particularly limited, and it can be determined, as appropriate, depending on intended use.

In one or more embodiments of the present invention, vinegar can also be used in the form of an organic acid-containing product. The type of such vinegar is the same as those listed above.

Examples of the above-described sugars include sucrose, maltose, fructose, isomerized glucose syrup, glucose, starch syrup, dextrin, and sugar alcohols such as sorbitol, maltitol or xylitol. These sugars may be used alone as a single type, or may also be used in any given combination of two or more types at any given ratio.

Examples of the above-described high-intensity sweetener include aspartame, acesulfame potassium, sucralose, neotame, licorice extract, stevia, and an enzyme-treated product thereof. These high-intensity sweeteners may be used alone as a single type, or may also be used in any given combination of two or more types at any given ratio. Moreover, the high-intensity sweeteners may also be used in combination with sugars.

The above-described common salt may be directly used, or may also be a food product containing such common salt. The food product containing common salt is not particularly limited. Examples of such a food product include soy sauce, miso (soybean pasta), and soup stock.

The above-described soy sauce is not particularly limited. Examples of the soy sauce include koikuchi (dark-colored) soy sauce, usukuchi (light-colored) soy sauce, white soy sauce, tamari (rich-tasting) soy sauce, and saishikomi (refermented) soy sauce. These soy sauces may be used alone as a single type, or may also be used in any given combination of two or more types at any given ratio.

The above-described miso is not particularly limited. Examples of the miso include barley miso, rice miso, bean miso, and mixed miso. Other examples of the miso include aka miso (dark brown miso), shiro miso (white miso), and tanshoku miso (light colored miso), which are named based on the color difference caused by the production method thereof. These miso products may be used alone as a single type, or may also be used in any given combination of two or more types at any given ratio.

The above-described spice means a kind of seasoning utilizing a part of a plant body (e.g., the fruit, pericarp, flower, bud, bark, stalk, leaf, seed, root, rhizome, etc., of a plant) having a unique flavor, stimulating taste and color tone, which is to be mixed into foods and beverages for the purpose of aromatization, deodorization, seasoning, coloration, etc. The term "spice" also includes herb. Examples of the spice include pepper (black pepper, white pepper, and red pepper), garlic, ginger, sesame (sesame seeds), capsicum, horseradish (*Armoracia rusticana*), mustard, poppy seeds, nutmeg, cinnamon, paprika, cardamom, cumin, saffron, allspice, clove, Japanese pepper, orange peel, fennel, licorice, fenugreek, Dill seed, Sichuan pepper, long pepper, and olive fruit. Among the spices, the herb means a seasoning utilizing stalks, leaves and flowers. Examples of such herb include watercress, coriander, Japanese basil, celery, tarragon, chives, chervil, sage, thyme, laurel, leek, parsley, mustard green (*Brassica juncea*), Japanese ginger, mugwort, basil, oregano, rosemary, peppermint, savory, lemon grass, Dill, Japanese horseradish leaves, and Japanese pepper leaves. These spices may be used alone as a single type, or may also be used in any given combination of two or more types at any given ratio.

The above-described spice extract is not particularly limited, as long as it is an extract from food products, which is generally displayed as "spice." Examples of the spice extract include capsicum extract, mustard extract, ginger extract, Japanese horseradish extract, pepper extract, garlic extract, onion extract, and Japanese pepper extract. These spice extracts may be used alone as a single type, or may also be used in any given combination of two or more types at any given ratio.

Examples of the above-described flavor oil include ginger oil, garlic oil, mustard oil, onion oil, sesame oil, green onion oil, leek oil, dropwort Japanese parsley oil, Japanese basil oil, Japanese horseradish oil, lemon oil, seafood oil, and poultry oil. These flavor oils may be used alone as a single type, or may also be used in any given combination of two or more types at any given ratio.

Examples of the above-described amino acid-based seasonings include L-sodium glutamate, DL-alanine, glycine, L- or DL-tryptophan, L-phenylalanine, L- or DL-methionine, L-lysine, L-aspartic acid, sodium L-aspartate, and L-arginine. These amino acid-based seasonings may be used alone as a single type, or may also be used in any given combination of two or more types at any given ratio.

Examples of the above-described nucleic acid-based seasonings include disodium 5'-inosinate, disodium 5'-guanylate, disodium 5'-uridylate, disodium 5'-cytidylate, calcium 5'-ribonucleotide, and disodium 5'-ribonucleotide. These nucleic acid-based seasonings may be used alone as a single type, or may also be used in any given combination of two or more types at any given ratio.

Examples of the above-described flavoring materials include soup stock from dried and smoked bonito, kelp soup stock, vegetable extract, bonito extract, kelp extract, seafood extract, poultry extract, and fruit juice. These flavoring materials may be used alone as a single type, or may also be used in any given combination of two or more types at any given ratio.

Examples of the above-described umami seasonings include protein hydrolysate and yeast extract. These umami seasonings may be used alone as a single type, or may also be used in any given combination of two or more types at any given ratio.

The above-described liquors include refined sake, synthetic refined sake, mirin (sweet cooking rice wine), Shochu (traditional Japanese distilled spirit), wine, liqueur, and Chinese (Shaoxing) rice wine. These liquors may be used alone as a single type, or may also be used in any given combination of two or more types at any given ratio.

Examples of the above-described flavor include ginger flavor, garlic flavor, mustard flavor, onion flavor, sesame flavor, green onion flavor, leek flavor, Japanese basil flavor, Japanese horseradish flavor, and lemon flavor. These flavors may be used alone as a single type, or may also be used in any given combination of two or more types at any given ratio.

Examples of the above-described viscosity adjuster include gum Arabic, alginic acid, sodium alginate, carrageenan, karaya gum, agar, locust bean gum, xanthan gum, guar gum, gellan gum, cellulose, tamarind seed gum, tarn gum, tragacanth gum, pullulan, pectin, chitin, chitosan, and processed starch. These viscosity adjusters may be used alone as a single type, or may also be used in any given combination of two or more types at any given ratio.

Method for Producing Liquid Seasoning Comprising Ingredients

The liquid seasoning according to one or more embodiments of the present invention can be produced by a method comprising a step of subjecting a raw material comprising at least an onion ingredient and an organic acid to a heat treatment (stew heating), and a step of leaving or cooling the resultant to an ordinary temperature (a room temperature) after completion of the heat treatment. The raw material to be subjected to a heat treatment may comprise, at least, an onion ingredient and an organic acid, and it may also comprise other materials. Such other materials may be added after completion of the heat treatment, depending on the type of the materials. The heat treatment is preferably carried out by a constant-temperature heat treatment (i.e., a heat treatment of heating a raw material to a predetermined temperature and then retaining it at the predetermined temperature). Specifically, the heating temperature is preferably 75° C. to 120° C., more preferably 85° C. to 120° C., and further preferably 85° C. to 95° C. The heating time depends on the heating temperature, and it can be adjusted as appropriate. The heating conditions are, for example, at 75° C. or higher and lower than 85° C., for 180 minutes to 240 minutes, or at 85° C. or higher and lower than 105° C., for 90 minutes to 240 minutes, preferably at 105° C. or higher and lower than 120° C., for 10 minutes to 90 minutes, more preferably at 85° C. or higher and lower than 105° C., for 90 minutes to 180 minutes, or at 105° C. or higher and lower than 120° C., for 10 minutes to 60 minutes, and further preferably at 85° C. or higher and lower than 95° C., for 90 minutes to 180 minutes. The heat treatment can be carried out, for example, by applying a method such as hot water heating, steam heating, retort heating, heater heating, high-frequency electromagnetic induction heating, tube-type high temperature heating, or Joule heating. For the heating by these methods, for example, conventionally known apparatuses including a batch-type stirring function-equipped jacketed tank, a retort sterilization device, an autoclave, or various types of heat exchangers such as a plate-type heat exchanger, a tube-type heat exchanger, or a steam injection-type heat exchanger can be used. The pressure applied upon the heat treatment is not particularly limited. From the viewpoint of retaining the food texture of ingredients, the heat treatment is preferably carried out under ordinary pressure.

The liquid seasoning obtained through the above-described steps is, directly or after being subjected to a sterilization treatment such as heat sterilization or pressurized sterilization, filled into a vessel, as in the case of common liquid seasonings. In one or more embodiments, the vessel used for the liquid seasoning is not particularly limited in terms of material or shape. Examples of the vessel include a plastic-made vessel, a pouch (a polyethylene pouch or an aluminum pouch), a PET bottle, a steel can, an aluminum can, and a bottle container. In addition, in one or more embodiments, the liquid seasoning obtained through the above-described steps is filled into a vessel, and is then subjected to a sterilization treatment such as heat sterilization or retort sterilization to produce a liquid seasoning filled in a vessel.

Mode of Using Liquid Seasoning Comprising Ingredients

Since the liquid seasoning according to one or more embodiments of the present invention comprises onions having stewed feeling, it can be used as a seasoning for stewed dishes, a seasoning for hamburger steaks, a seasoning for steaks, a seasoning for grilled meats, a seasoning for daily dishes, a seasoning for pasta, a seasoning for Chinese fried rice, a seasoning for soup, a seasoning for dumplings, a seasoning for hot-pots, a seasoning for noodles, a seasoning for rice, a seasoning for Kamameshi (Japanese rice pilaf cooked in an iron pot), a seasoning for foods dressed with a thick starchy sauce, a seasoning for tofu, a seasoning for tendon (a bowl of rice topped with tempura), a seasoning for aemono (sauce-dressed dishes), a seasoning for sauteed food, a seasoning for microwave, a seasoning for Sundubu-jjigae, a seasoning for stir-fry, a seasoning for Takikomi Gohan (Japanese rice dishes seasoned and cooked with various ingredients), a seasoning for Gomoku Gohan (Japanese rice dishes seasoned and cooked with various ingredients), a seasoning for kimuch, a seasoning for fried food, a seasoning for ramen noodles, a seasoning for Shabu Shabu, or a seasoning for dip. The liquid seasoning according to one or more embodiments of the present invention is particularly useful as a seasoning for heating cooking, which is added upon heating cooking, or is used as a seasoning for hot dishes, by being applied to hot dishes after completion of the heating cooking. The liquid seasoning according to one or more embodiments of the present invention is particularly preferably used as a seasoning for stewed dishes, a seasoning for hamburger steaks, a seasoning for steaks, a seasoning for grilled meats, a seasoning for daily dishes, a seasoning for pasta, a seasoning for Chinese fried rice, a seasoning for soup, or a seasoning for dumplings.

EXAMPLES

Hereinafter, one or more embodiments of the present invention will be more specifically described in the following examples. However, these examples are not intended to limit the scope of the present invention.

Test Example 1

Studies Regarding Heat Processing of Ingredients and pH (1) Preparation of Test Products (Examples 1 to 3, and Comparative Examples 1 and 2)

Organic acid (acetic acid or malic acid), sugar, and common salt were mixed into water at the mixed amounts (% by mass) shown in Table 1, and were then uniformly stirred to prepare a seasoning liquid. It is to be noted that brewed vinegar (acidity: 10%) was used as acetic acid.

Onions were cut into a size of 5 mm square, and thereafter, three types of onion ingredients, namely, unprocessed raw onions, dried onions, which were dried by a hot air treatment, and boiled onions, which were heated in boiled water (95° C., 30 min), were prepared. These onion ingredients were each poured into the above-described seasoning liquid, so that the content (wet weight) of each onion ingredient that had been swollen in the seasoning liquid could be 40% by mass, based on the total mass of the liquid seasoning. The thus obtained mixture was uniformly stirred, and was then subjected to a heat treatment, in which the mixture in a vessel was warmed with hot water at 90° C. for 120 minutes. Thereafter, the resulting mixture was filled into a bottle and was then subjected to natural cooling, so as to prepare liquid seasonings comprising individual ingredients to be used as test products.

(2) Test of Analyzing Component

Measurement of the Content (% by Mass) of Cycloalliin in Liquid Seasoning

A sample, which had been prepared by homogenizing the liquid seasoning comprising each ingredient used as a test product using a mixer, was 20-fold diluted with a 0.05 M phosphate buffer (pH 2.6) (wherein 1 g of the collected sample was diluted with the buffer to 20 ml), and was then filtered through a 0.45-μm filter. This sample was subjected to an HPLC analysis under the following conditions. As a reference sample, a cycloalliin hydrochloride monohydrate was used.

Conditions for Analysis

Column: Kanto Kagaku Mightysil RP-18 GP250-4.6 (5 μm)
Mobile phase: 0.05 M phosphate buffer (pH 2.6): methanol=85:15
Column temperature: 40° C.
Flow rate: 0.5 ml/min
Detector: UV Detector, 210 nm
Analysis time: 35 minutes
Amount injected: 10 μL Calculation of the Content (% by Mass) of Cycloalliin to Swollen Onion Ingredient The content (% by mass) of cycloalliin to the swollen onion ingredient (C) was calculated according to the following equation, using the content (% by mass) of cycloalliin that had been swollen in the liquid seasoning as measured above (A), and the content (% by mass) of onions that had been swollen in the seasoning liquid (B).

$$(C)=(A)/(B)\times 100$$

Measurement of Glutamic Acid

The liquid seasoning comprising the ingredient used as a test product was diluted with water and a lithium citrate buffer (pH 2.2), and was then filtered through a 0.45-μm filter. Thereafter, glutamic acid in the obtained filtrate was analyzed using an amino acid analyzer (JCL-500/V, manufactured by JEOL Ltd.).

(3) Sensory Evaluation Test

The liquid seasoning comprising the ingredient used as a test product was heated to 50° C. and was then subjected to sensory evaluation regarding "the taste of onions," "the stewed feeling of the ingredient," and "the food texture of the ingredient." The sensory evaluation was carried out with total four professional inspectors for the sensory test, in accordance with the below-mentioned criteria. As a method of calculating the score in each evaluation item, a weighted average was calculated from the evaluation scores obtained by the four inspectors, and the obtained value was then rounded off to the decimal point. The comprehensive evaluation was obtained by calculating a weighted average from the score of each evaluation item. Three points that are the intermediate point of the 5-point evaluation were defined as a standard. Four points higher than the 3 points were evaluated to have good effects, and five points were evaluated to have better effects.

Taste of Onions

5: The taste of onions is sufficiently felt.
4: The taste of onions is felt.
3: The taste of onions is slightly felt.
2: The taste of onions is weak.
1: No taste of onions is felt.

Stewed Feeling of the Ingredient

5: The ingredient is felt to be fully stewed.
4: The ingredient is felt to be stewed.
3: The ingredient is felt to be stewed to a certain extent.
2: Stewed feeling is weak.
1: No stewed feeling is felt.

Food Texture of the Ingredient

5: There is moderate food texture, and it is sufficiently filling.
4: There is moderate food texture, and it is filling.
3: There is slight food texture, and it is slightly filling.
2: The ingredient is slightly hard, resulting in poor food texture, or it is slightly soft and it is not filling.
1: The ingredient is hard, resulting in poor food texture, or it is sticky and it is no filling.

(4) Test Results

The pH, the content (% by mass) of cycloalliin to the swollen onion ingredient, the content (% by mass) of cycloalliin in the liquid seasoning, glutamic acid (ppm by mass), and the results of the sensory evaluation are shown in Table 1.

TABLE 1

|  | Example | | | Comparative Example | |
| --- | --- | --- | --- | --- | --- |
|  | 1 | 2 | 3 | 1 | 2 |
| <Seasoning formulation> (% by mass) | | | | | |
| Brewed vinegar (acidity: 10%) | 20 | — | 20 | 20 | — |
| Malic acid | — | 2 | — | — | 2 |
| Sugar | 20 | 20 | 20 | 20 | 20 |
| Common salt | 3 | 3 | 3 | 3 | 3 |
| Water | Suitable amount | Suitable amount | Suitable amount | Suitable amount | Suitable amount |
| Onions (after swelling) (B) | 40 | 40 | 40 | 40 | 40 |
| Total | 100 | 100 | 100 | 100 | 100 |
| Type of onions used | Dried | Dried | Boiled | Raw | Raw |
| <Analytical value> | | | | | |
| pH | 3.4 | 2.71 | 3.12 | 3.17 | 2.43 |
| Content (mass %) of cycloalliin to onion ingredient after swelling (A)/(B) × 100 | 0.40 | 0.50 | 0.33 | 0.25 | 0.28 |
| Content (mass %) of cycloalliin in liquid seasoning (A) | 0.16 | 0.20 | 0.13 | 0.10 | 0.11 |
| Glutamic acid (mass ppm) | 80 | 87 | 154 | 136 | 145 |
| <Sensory evaluation results> | | | | | |
| Taste of onions | 4 | 4 | 4 | 2 | 2 |
| Stewed feeling of ingredients | 5 | 5 | 4 | 3 | 3 |
| Food texture of ingredients | 5 | 5 | 4 | 2 | 2 |
| Comprehensive evaluation | 5 | 5 | 4 | 3 | 2 |

As shown in Table 1, in the case of the test products obtained by using dried onions or boiled onions and subjecting such onions to a heat treatment (90° C., 120 min) in the presence of organic acid, the content of cycloalliin to the onion ingredient that had been swollen in the seasoning liquid was 0.30% by mass or more, the content of cycloalliin in the liquid seasoning was 0.12% by mass or more, and the pH was in the range of pH 2.5 to 4.5 (Examples 1 to 3). The test products of these Examples had good evaluation in terms of "the taste of onions," "the stewed feeling of the ingredient," and "the food texture of the ingredient." Specifically, because of the moderate hardness and specific flavor of the onion used as an ingredient, good stewed feeling and good food texture were provided, and the taste of onions was sufficiently felt in the seasoning liquid. In contrast, in the case of the test products obtained using raw onions, the content of cycloalliin to the onion ingredient that had been swollen in the seasoning liquid was less than 0.30% by mass, the content of cycloalliin in the liquid seasoning was less than 0.12% by mass (Comparative Examples 1 and 2), and the pH was less than 2.5 (Comparative Example 2). The test products of these Comparative Examples were not satisfactory in terms of "the taste of onions," "the stewed feeling of the ingredient," and "the food texture of the ingredient."

Test Example 2

Studies Regarding Heat Treatment Conditions (Time and Temperature)

(1) Preparation of Test Products (Examples 4 to 7 and Comparative Examples 3 to 7)

A seasoning liquid was prepared by the same seasoning formulation as that of Example 1. Dried onions were used as ingredients, such that the content thereof could be 40% by mass (B) based on the total mass of the liquid seasoning, after the onions had been swollen in the seasoning liquid. Thereafter, the liquid seasonings comprising individual ingredients of Examples 4 to 6 and Comparative Examples 3 to 7 were prepared in the same manner as that of Test Example 1, with the exception that conditions for the heat treatment were changed as shown in Table 2. On the other hand, a uniformed seasoning was filled into a hermetically sealed glass bottle, and the bottle was then hermetically sealed with a silicon cap. Thereafter, the bottle was heated using an autoclave (MLS-3780, manufactured by SANYO Electric Co., Ltd.) under the conditions shown in Table 2, and was then naturally cooled to prepare the liquid seasoning comprising the ingredient of Example 7.

(2) Component Analysis and Sensory Evaluation Test

The liquid seasoning comprising the ingredient used as a test product was subjected to component analysis and sensory evaluation in the same manner as that of Test Example 1.

(3) Test Results

The pH, the content (% by mass) of cycloalliin to the swollen onion ingredient, the content (% by mass) of cycloalliin in the liquid seasoning, glutamic acid (ppm by mass), and the results of the sensory evaluation are shown in Table 2.

was less than 0.12% by mass. Moreover, the test products of these Comparative Examples were not satisfactory in terms of "the taste of onions," "the stewed feeling of the ingredient," and "the food texture of the ingredient."

Test Example 3

Studies Regarding pH Conditions (1) Preparation of Test Products (Examples 8 to 11 and Comparative Example 8)

Liquid seasonings comprising individual ingredients used as test products were prepared in the same manner as that of Test Example 1, with the exceptions that dried onions were

TABLE 2

|  | Example | | | | Comparative Example | | | | |
| --- | --- | --- | --- | --- | --- | --- | --- | --- | --- |
|  | 4 | 5 | 6 | 7 | 3 | 4 | 5 | 6 | 7 |
| <Heat treatment: temperature/time> | | | | | | | | | |
| 60° C. | — | — | — | — | — | — | 90 min | 180 min | — |
| 75° C. | 180 min | — | — | — | — | — | — | — | 90 min |
| 90° C. | — | 90 min | 180 min | — | — | 30 min | — | — | — |
| 110° C. | — | — | — | 20 min | — | — | — | — | — |
| <Analytical value> | | | | | | | | | |
| pH | 3.4 | 3.5 | 3.4 | 3.4 | 3.4 | 3.4 | 3.4 | 3.4 | 3.4 |
| Content (mass %) of cycloalliin to onion ingredient after swelling (A)/(B) × 100 | 0.30 | 0.33 | 0.38 | 0.53 | 0.25 | 0.28 | 0.25 | 0.25 | 0.28 |
| Content (mass %) of cycloalliin in liquid seasoning (A) | 0.12 | 0.13 | 0.15 | 0.21 | 0.10 | 0.11 | 0.10 | 0.10 | 0.11 |
| Glutamic acid (mass ppm) | 81 | 82 | 80 | 64 | 171 | 82 | 78 | 82 | 82 |
| <Sensory evaluation results> | | | | | | | | | |
| Taste of onions | 5 | 5 | 5 | 4 | 1 | 3 | 3 | 3 | 3 |
| Stewed feeling of ingredients | 4 | 5 | 5 | 5 | 1 | 3 | 2 | 2 | 3 |
| Food texture of ingredients | 4 | 5 | 5 | 3 | 2 | 3 | 3 | 3 | 3 |
| Comprehensive evaluation | 4 | 5 | 5 | 4 | 1 | 3 | 3 | 3 | 3 |

As shown in Table 2, in the case of the test products obtained by subjecting the onions to a heat treatment at a temperature of 75° C. to 120° C., the content of cycloalliin to the ingredient that had been swollen in the seasoning liquid was 0.30% by mass or more, and the content of cycloalliin in the liquid seasoning was 0.12% by mass or more (Examples 4 to 7). The test products of these Examples had good evaluation in terms of "the taste of onions," "the stewed feeling of the ingredient," and "the food texture of the ingredient." Specifically, because of the moderate hardness and specific flavor of the onion used as an ingredient, good stewed feeling and good food texture were provided, and the taste of onions was sufficiently felt in the seasoning liquid. In contrast, in the case of the liquid seasoning (Comparative Example 3) that had not subjected to a heat treatment, the test products (Comparative Examples 5 and 6) that had been subjected to a heat treatment at 60° C., and the test products (Comparative Examples 4 and 7) that had been subjected to a heat treatment at 75° C. or higher but the heating time was not sufficient relevant to the temperature, the content of cycloalliin to the onion ingredient that had been swollen in the seasoning liquid was less than 0.30% by mass, and the content of cycloalliin in the liquid seasoning used as ingredients, such that the content thereof could be 40% by mass (B) based on the total mass of the liquid seasoning, after the onions had been swollen in the seasoning liquid, and that the used amount of brewed vinegar (10% acetic acid) in the formulation of Example 1 was changed to those shown in Table 3.

(2) Component Analysis and Sensory Evaluation Test

The liquid seasoning comprising the ingredient used as a test product was subjected to component analysis and sensory evaluation in the same manner as that of Test Example 1.

(3) Test Results

The pH, the content (% by mass) of cycloalliin to the swollen onion ingredient, the content (% by mass) of cycloalliin in the liquid seasoning, glutamic acid (ppm by mass), and the results of the sensory evaluation are shown in Table 3.

TABLE 3

|  | Example | | | | Comparative Example |
|---|---|---|---|---|---|
|  | 8 | 9 | 10 | 11 | 8 |
| Brewed vinegar (10% acetic acid) (mass %) | 5 | 10 | 20 | 40 | 0.5 |
| <Analytical value> | | | | | |
| pH | 3.79 | 3.7 | 3.4 | 3.2 | 5.20 |
| Content (mass %) of cycloalliin to onion ingredient after swelling (A)/(B) × 100 | 0.30 | 0.33 | 0.40 | 0.38 | 0.28 |
| Content (mass %) of cycloalliin in liquid seasoning (A) | 0.12 | 0.13 | 0.16 | 0.15 | 0.11 |
| Glutamic acid (mass ppm) | 82 | 80 | 80 | 84 | 76 |
| <Sensory evaluation results> | | | | | |
| Taste of onions | 4 | 4 | 4 | 4 | 2 |
| Stewed feeling of ingredients | 4 | 4 | 5 | 5 | 2 |
| Food texture of ingredients | 4 | 4 | 5 | 4 | 3 |
| Comprehensive evaluation | 4 | 4 | 5 | 5 | 2 |

As shown in Table 3, in the case of the test products obtained by using 5% to 40% by mass of brewed vinegar (10% acetic acid), the pH was in the range of pH 2.5 to 4.5, the content of cycloalliin to the onion ingredient that had been swollen in the seasoning liquid was 0.30% by mass or more, and the content of cycloalliin in the liquid seasoning was 0.12% by mass or more (Examples 8 to 11). The test products of these Examples had good evaluation in terms of "the taste of onions," "the stewed feeling of the ingredient," and "the food texture of the ingredient." Specifically, because of the moderate hardness and specific flavor of the onion used as an ingredient, good stewed feeling and good food texture were provided, and the taste of onions was sufficiently felt in the seasoning liquid. In contrast, in the case of the test product having a pH value of more than 4.5, the content of cycloalliin to the onion ingredient that had been swollen in the seasoning liquid was less than 0.30% by mass, and the content of cycloalliin in the liquid seasoning was less than 0.12% by mass (Comparative Example 8), and thus, "the taste of onions," "the stewed feeling of the ingredient," and "the food texture of the ingredient" were not satisfactory.

Test Example 4

Influence of Addition of Umami Component (1) Preparation of Test Products (Examples 12 to 17)

Umami components (sodium glutamate, yeast extract, and wine), as well as brewed vinegar (acidity: 10%), sugar, and common salt were mixed into water at the mixed amounts (%) by mass) shown in Table 4. Thereafter, each liquid seasoning comprising the ingredient used as a test product was prepared in the same manner as that of Test Example 1.

(2) Component Analysis and Sensory Evaluation Test

The liquid seasoning comprising the ingredient used as a test product was subjected to component analysis and sensory evaluation in the same manner as that of Test Example 1.

(3) Test Results

The pH, the content (% by mass) of cycloalliin to the swollen onion ingredient, the content (% by mass) of cycloalliin in the liquid seasoning, glutamic acid (ppm by mass), and the results of the sensory evaluation are shown in Table 4.

TABLE 4

|  | Example | | | | | |
|---|---|---|---|---|---|---|
|  | 12 | 13 | 14 | 15 | 16 | 17 |
| <Seasoning formulation> (% by mass) | | | | | | |
| Brewed vinegar (acidity: 10%) | 12 | 12 | 12 | 12 | 12 | 12 |
| Sugar | 11 | 11 | 11 | 11 | 11 | 11 |
| Koikuchi soy sauce | 2.4 | 2.4 | 2.4 | 2.4 | 2.4 | 2.4 |
| Common salt | 4 | 4 | 4 | 4 | 4 | 4 |
| Sodium glutamate | — | 0.2 | — | — | 0.2 | — |
| Yeast extract | — | — | 0.2 | — | — | 0.2 |
| Wine | — | — | — | 1 | 1 | 1 |
| Dried onions (after swelling) (B) | 40 | 40 | 40 | 40 | 40 | 40 |
| Water | Suitable amount | Suitable amount | Suitable amount | Suitable amount | Suitable amount | Suitable amount |
| Total | 100 | 100 | 100 | 100 | 100 | 100 |
| Heat treatment: 90° C., 120 min | Yes | Yes | Yes | Yes | Yes | Yes |

TABLE 4-continued

|  | Example | | | | | |
|---|---|---|---|---|---|---|
|  | 12 | 13 | 14 | 15 | 16 | 17 |
| <Analytical value> | | | | | | |
| pH | 3.8 | 3.8 | 3.8 | 3.8 | 3.8 | 3.8 |
| Content (mass %) of cycloalliin to onion ingredient after swelling (A)/(B) × 100 | 0.48 | 0.48 | 0.68 | 0.45 | 0.43 | 0.65 |
| Content (mass %) of cycloalliin in liquid seasoning (A) | 0.16 | 0.19 | 0.27 | 0.18 | 0.17 | 0.26 |
| Glutamic acid (mass ppm) | 86 | 2158 | 987 | 121 | 2208 | 1034 |
| <Sensory evaluation results> | | | | | | |
| Taste of onions | 4 | 4 | 5 | 4 | 4 | 5 |
| Stewed feeling of ingredients | 4 | 4 | 5 | 4 | 4 | 5 |
| Food texture of ingredients | 4 | 4 | 4 | 4 | 4 | 4 |
| Comprehensive evaluation | 4 | 4 | 5 | 4 | 4 | 5 |

As shown in Table 4, by addition of the umami components (sodium glutamate, yeast extract, and wine), the content of cycloalliin became a specific amount or greater, and the content of glutamic acid became in the range of 70 to 3000 ppm by mass (Examples 12 to 17). The test products of these Examples had good evaluation in terms of "the taste of onions," "the stewed feeling of the ingredient," and "the food texture of the ingredient." Specifically, because of the moderate hardness and specific flavor of the onion used as an ingredient, good stewed feeling and good food texture were provided, and the taste of onions was sufficiently felt in the seasoning liquid.

Besides, the test product was examined and evaluated under the same conditions as those of Example 14, with the exception that the amount of cycloalliin was adjusted so that the content of cycloalliin to the swollen onion ingredient could be 2.0% by mass. As a result, in terms of "the taste of onions," "the stewed feeling of the ingredient," and "the food texture of the ingredient," the same evaluation as that of Example 14 was obtained, but an off-taste was slightly felt.

Test Example 5

Heating Cooking Method of Using Liquid Seasoning Comprising Ingredient 100 g of Hamburger steak was cooked with a frying pan and was then served on a roasting dish. Thereafter, the liquid seasonings comprising ingredients of Example 5 and Comparative Example 5 were each placed in a 100-g frying pan, were then heated with a low flame for 1 minute, and were then applied onto the hamburger steak. The thus obtained hamburger steak was eaten. As a result, the hamburger steak with the liquid seasoning of Example 5 provided "the taste of onions," "the stewed feeling of the ingredient" and "the food texture of the ingredient," and thus, it was satisfactory. In contrast, in the hamburger steak with the liquid seasoning of Comparative Example 5, the "the stewed feeling of the ingredient" was weak, and "the taste of onions" and "the food texture of the ingredient" were not sufficiently provided. Thus, the liquid seasoning of Comparative Example 5 was not satisfactory.

One or more embodiments of the present invention relate to a liquid seasoning comprising ingredients, in which the stewed feeling of onions used as ingredients and the taste of onions in a seasoning liquid are improved, and onion-derived flavor and rich taste are imparted to the entire seasoning, and this liquid seasoning comprising ingredients can be utilized in the manufacturing field of liquid seasonings that can be easily used in cooking, etc.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A liquid seasoning, comprising:
    a seasoning liquid; and
    ingredients containing an onion ingredient,
    wherein:
        a length of a longest side of the onion ingredient in the liquid seasoning is from 1 to 60 mm,
        the seasoning liquid comprises an organic acid,
        the onion ingredient is a stew heating treated onion in presence of the organic acid in the seasoning liquid at a temperature of 75° C. to 120° C.,
        the stew heating treated onion comprises at least one heat-treated onion selected from the group consisting of dried onion, boiled onion, steamed onion, sauteed onion, and caramelized onion,
        an amount of cycloalliin in the liquid seasoning with respect to an amount of the onion ingredient swollen in the seasoning liquid is 0.30% by mass or more, and
        pH of the seasoning liquid is 2.5 to 4.5, and
        the cycloalliin in the liquid seasoning is cycloalliin from the onion ingredient.

2. The liquid seasoning according to claim 1, wherein a content of cycloalliin in the liquid seasoning is 0.12% by mass or more.

3. The liquid seasoning according to claim 1, wherein the organic acid is at least one selected from the group consisting of acetic acid, malic acid, citric acid, lactic acid, and succinic acid.

4. The liquid seasoning according to claim 1, wherein the raw material comprises at least one organic acid-containing product selected from the group consisting of vinegar, fruit juice, and organic acid-based seasonings, and wherein the organic acid is an organic acid contained in the at least one organic acid-containing product.

5. The liquid seasoning according to claim 1, wherein a content of glutamic acid in the liquid seasoning is 70 to 3000 ppm by mass.

6. The liquid seasoning according to claim 1, wherein a content of the onion ingredient in the liquid seasoning is 20 to 80% by mass.

7. The liquid seasoning according to claim 1, wherein a content of the organic acid in the liquid seasoning is 0.1 to 5.0% by mass.

\* \* \* \* \*